United States Patent [19]

Maeda et al.

[11] Patent Number: 4,604,830
[45] Date of Patent: Aug. 12, 1986

[54] FLUSH-SURFACED AUTOMOBILE DOOR ASSEMBLY

[75] Inventors: Tatsuo Maeda; Takeshi Konishi, both of Hiroshima, Japan

[73] Assignee: Mazda Motor Corporation, Hiroshima, Japan

[21] Appl. No.: 694,817

[22] Filed: Jan. 25, 1985

[30] Foreign Application Priority Data

Jan. 31, 1984 [JP] Japan .................. 59-12929[U]
Jan. 31, 1984 [JP] Japan .................. 59-12930[U]

[51] Int. Cl.⁴ ............................................ E05F 11/38
[52] U.S. Cl. .................................... 49/374; 49/440
[58] Field of Search .......... 49/374, 375, 440, 441, 49/485, 489

[56] References Cited

U.S. PATENT DOCUMENTS 4,457,111 7/1984 Kóike .............................. 49/441
4,490,942 1/1985 Arnheim et al. ............... 49/440 X Primary Examiner—Kenneth Downey
Attorney, Agent, or Firm—Burns, Doane, Swecker and Mathis

[57] ABSTRACT

A door assembly for an automobile having a door body, which comprises a window pane adapted to be raised from and lowered into the door body, a window sash mounted on the top of the door body and positioned generally inwardly of the window pane with respect to the interior of the automobile, which window sash includes an inner peripheral flange of generally U-shaped cross section opening in a direction towards and outwardly of a peripheral edge of the window pane, and also an outer peripheral flange carrying a sealing member for sealing a gap between the window pane and the window sash, and guide blocks secured to the window pane, each of which guide blocks has a finger portion slidingly protruding into the U-sectioned space in the inner peripheral flange for the guidance of the window pane during the raising and lowering thereof from and into the door body.

9 Claims, 5 Drawing Figures

FLUSH-SURFACED AUTOMOBILE DOOR ASSEMBLY

BACKGROUND OF THE INVENTION

The present invention generally relates to an automobile door assembly of a type generally referred to as a "flush-surfaced door assembly" and, more particularly, to a window structure in the flush-surfaced door assembly.

In order to cope with a streamlined design of an automobile body structure and/or to maximize the interior space for a given size of the automobile body structure, it is well known, as shown in FIG. 1 of the accompanying drawings, to provide the automobile 1 with so-called flush-surfaced door assemblies each comprising a door body 2, constituted by a generally double-walled structure having an inner door panel (not shown) and an outer door panel 4, and a window pane 3 adapted to be raised from and lowered into the space defined between the inner and outer door panels for closing and opening the window, respectively, which window pane 3 is positioned generally in flush with the outer door panel 4.

Designs of the prior art flush-surfaced door assemblies are many, one example of which is shown in FIG. 2 of the accompanying drawings. The prior art flush-surfaced door assembly for an automobile, particularly, a passenger's car, so far shown in FIG. 2 comprises a door body 5 on which a window sash 6 is mounted on the top thereof and located inwardly of the window pane 3 with respect to the interior of the automobile body structure. The window sash 6 includes a pair of upright guide rails 7 slidingly engaged with a plurality of guide blocks 8 secured to the inner surface of the window pane 3 so that the window pane 3 can be selectively raised from and lowered into the space in the double-walled door body 5 with the guide blocks 8 slidingly guided along the upright guide rails 7.

An example of the prior art guide mechanisms for guiding the window pane along the guide rails forming parts of the window sash is illustrated in FIG. 3 of the accompanying drawings in cross-sectional representation taken in a direction perpendicular to one of the guide rails, for example, the rear guide rail with respect to the longitudinal sense of the automobile body structure. The guide mechanism shown in FIG. 3 is disclosed in U.S. Pat. No. 4,240,227, patented Dec. 23, 1980, and is so designed that, while the respective guide rail 7 is constituted by a channel member 9 opening towards the window pane 3 positioned inwardly of the window sash 6 with respect to the interior of the automobile body structure, the guide block 8 secured to the inner surface of the window pane 3 is slidingly engaged in the guide rail 7. Although the guide mechanism disclosed in the above mentioned U.S. patent appears satisfactory so far as the guiding of the window pane is concerned, it has, however, been found problematic in that not only are the guide blocks 8 readily viewable from inside the automobile body structure providing eyesores to one or more passengers occupying the respective seats inside the automobile, but also raindrops entering the guide rail 7 through a gap between a respective peripheral edge 3a of the window pane 3 and a sealing strip 11 tend to readily penetrate into the interior of the automobile body structure through the opening 10 in the guide rail 7.

SUMMARY OF THE INVENTION

Accordingly, the present invention has been devised to substantially eliminating the above discussed problems and inconveniences inherent in the prior art flush-surfaced door assemblies for an automobile body structure and has for its essential object to provide an improved door assembly wherein not only can the guide blocks secured to the window pane not be viewed from inside the automobile body structure, but the sealability of the door assembly is improved to avoid any possibility of the raindrops entering the interior of the automobile body structure.

In order to accomplish the above described object of the present invention, the guide rail is constituted by an inner peripheral flange of generally U-shaped cross section formed at an inner peripheral region of the window sash so as to open in a direction towards the respective edge of the window pane. At least one guide block secured to the window pane is slidingly engaged in the respective guide rail so that, during the selective raising and lowering of the window pane from and into the space in the double-walled door body, the window pane can be guided along the guide rail.

Since the present invention is such that the inner peripheral flange of the window sash, which forms the respective guide rail, opens in a direction towards the respective peripheral edge of the window pane while the guide block is slidingly engaged in the guide rail, the gap between the window pane and the guide rail can be minimized to a value sufficient to avoid any possible rubbing or friction oi the window pane during the movement thereof from and into the space in the double-walled door body. Therefore, no guide blocks fall within the sight of one or more passengers inside the automobile body structure.

In addition, since the inner peripheral flange is of generally U-shaped cross section and serves as a rain rail, any raindrops entering in the gap between the edge of the window pane and the sealing member will hardly penetrate into the interior of the automobile structure.

BRIEF DESCRIPTION OF THE DRAWINGS

These and other objects and features of the present invention will become clear from the following detailed description taken in conjunction with preferred embodiments thereof with reference to the accompanying drawings, in which.

DETAILED DESCRIPTION OF THE EMBODIMENTS

Figure 1:
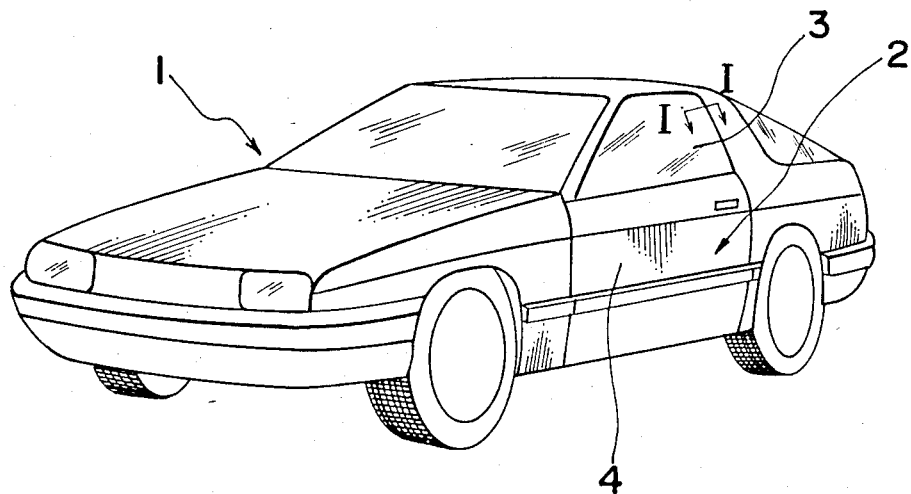
FIG. 1 is a perspective view of an automobile having the flush-surfaced door assemblies.
Figure 2:
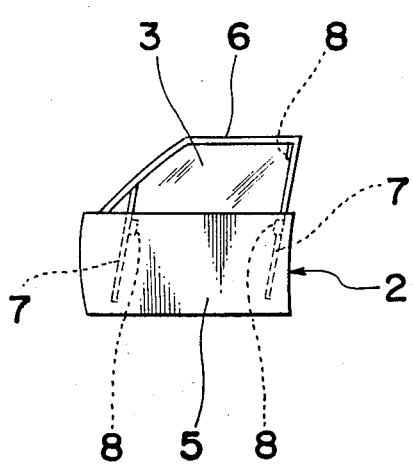
FIG. 2 is a plan view of one of the flush-surfaced door assemblies as viewed from inside the automobile body structure.
Figure 3:
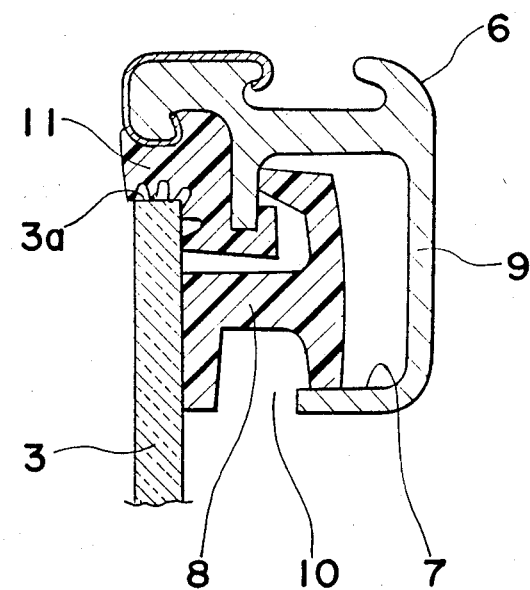
FIG. 3 is a cross-sectional view of the guide mechanism in the art window sash in the automobile door assembly.

Before the detailed description of the embodiments of the present invention proceeds, it is to be noted that like parts are designated by like reference numerals throughout the accompanying drawings except for FIGS. 1 to 3 for the sake of brevity.

Figure 4:
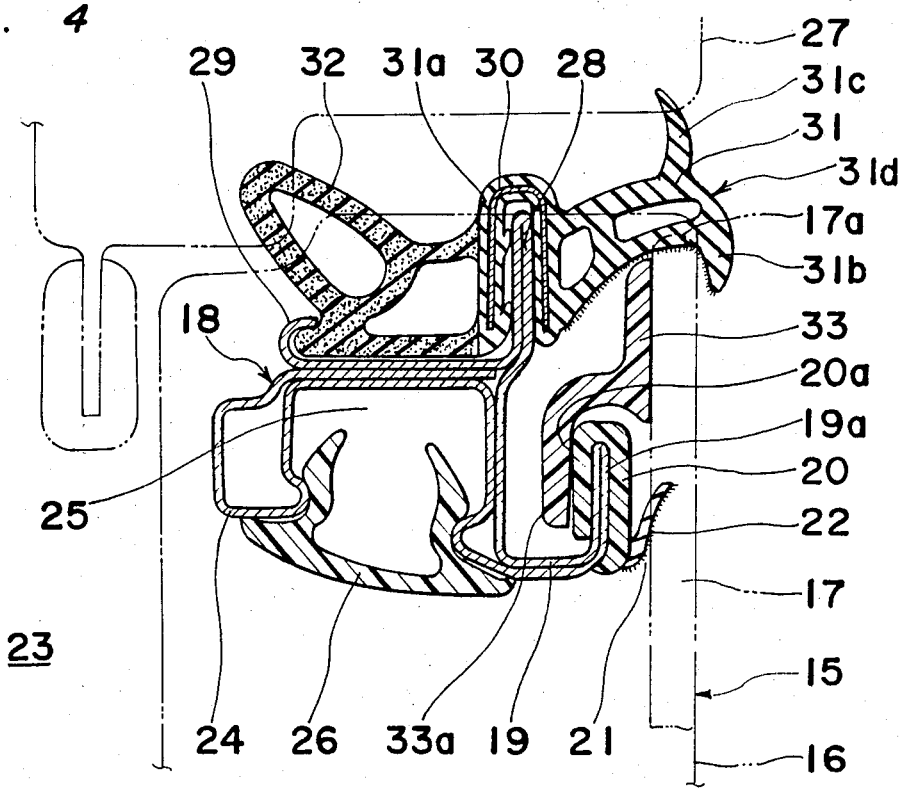
FIG. 4 is a cross-sectional view, on an enlarged scale, taken along the line I—I in FIG. 1, showing a first preferred embodiment of the present invention.

Referring first to FIG. 4, a flush-surfaced door assembly 15 for an automobile comprises a door body 16 of generally double-walled structure constituted by inner and outer door panels, and a window sash 18 mounted on the top of the door body 16 so as to extend upwards therefrom and positioned inwardly of a window pane 17 which is adapted to be raised from and lowered into the space inside the double-walled door body 16 for closing and opening.

The window sash 18 has its inner peripheral region formed with an inner peripheral flange 19 of generally U-shaped cross section opening in a direction facing a peripheral edge 17a of the window pane 17. The inner peripheral flange 19 has a back-turned flange portion 19a receiving a guide rail 20 mounted thereon for guiding guide blocks 33 secured to the window pane 17 in spaced relation to each other as will be described later.

A clearance between the guide rail 20 and the window pane 17, generally identified by 21, is so selected to be small enough to avoid any possible relative rubbing or friction between the window pane 17 and the guide rail 20 and is provided with a bristled solid rubber 22 bonded to the guide rail 20 so as to extend outwardly therefrom and terminate in sliding contact with the window pane 17 thereby to fill up the clearance 21 in a water-tight manner.

A generally U-shaped opening 25 defined in the window sash 18 between an inside peripheral flange 24, forming another part of the window sash 18 and positioned inwardly of the inner peripheral flange 19 with respect to the interior 23 of the automobile body structure, and the inner peripheral flange 19 is covered by a garnish moulding 26.

The window sash 18 has an outer peripheral region with respect to the window pane 17 formed into an outer peripheral flange 28 confronting and lying in a plane substantially perpendicular to the automobile body structure 27 (particularly, a pillar) and also a portion adjacent the inside peripheral flange 24 formed with a generally U-sectioned flange 29 turned backwards in a direction facing the window pane 17. The outer peripheral flange 28 is provided with a windowpane sealing member 31 mounted thereon for sealing a gap between the window pane 17 and the window sash 18 and, at the same time, a gap between the window sash and the automobile body structure 27 (pillar).

This windowpane sealing member 31 is of a type comprising a mounting portion 31a of generally U-shaped cross section with a core metal 30 embedded therein and is mounted on the outer peripheral flange 28 with the U-sectioned mounting portion 31a tightly receiving the outer peripheral flange 28 therein. The sealing member 31 also comprises a sealing portion 31d integral with and extending from the mounting portion 31a in a direction outwardly of the interior 23 of the automobile body structure and towards the gap between the automobile body structure 27 and the window pane 17, the free end of said sealing portion 31d being formed into a first tongue 31b and a second tongue 31c. The first tongue 31b is used to exteriorly cover the edge of the window pane 17 in sliding contact therewith whereas the second tongue 31c is used to seal the gap between the window sash 18 and the automobile body structure 27.

The U-sectioned flange 29 of the window sash 18 is provided with an elastic member 32 for sealing the gap between the window sash 18 and the automobile body structure (pillar) 27, said elastic member 32 being integrally bonded with the windowpane sealing member 31.

Cooperable with the guide rail 20 for the guidance of the window pane 17 during the raising and lowering from and into the space in the double-walled door body 16 is a plurality of guide blocks 33 each being secured by e.g., adhesive to the inner surface of the window pane facing the interior adjacent a respective edge portion thereof confronting the door sash 18. Each guide block 33 secured to the window pane 17 has a finger 33a integral therewith and protruding therefrom in a direction generally parallel to and inwardly of the window pane 17 and into the U-sectioned space defined by the inner peripheral flange 19 while a portion of the finger 33a confronting the window pane 17 is held in sliding contact with the guide rail 20. It will readily be seen that each guide block 33 secured to the window pane 17 is slidingly coupled with the guide rail 20 generally in a handshake fashion as is clearly shown in FIG. 4.

In the construction hereinabove described with reference to FIG. 4, since the clearance 21 between the guide rail 20 and the window pane 17 can advantageously be minimized, any guide block 33 does not fall into the field of sight of one or more passengers inside the automobile body structure and will provide no eyesore. Moreover, most of the raindrops entering exteriorly through the gap between the peripheral edge 17a of the window pane 17 and the windowpane sealing member 31 can be advantageously drained downwardly along the inner peripheral flange 19 which concurrently serves as a rain rail, and therefore, no raindrop will substantially enter into the interior 23 of the automobile body structure through the clearance 21.

Figure 5:
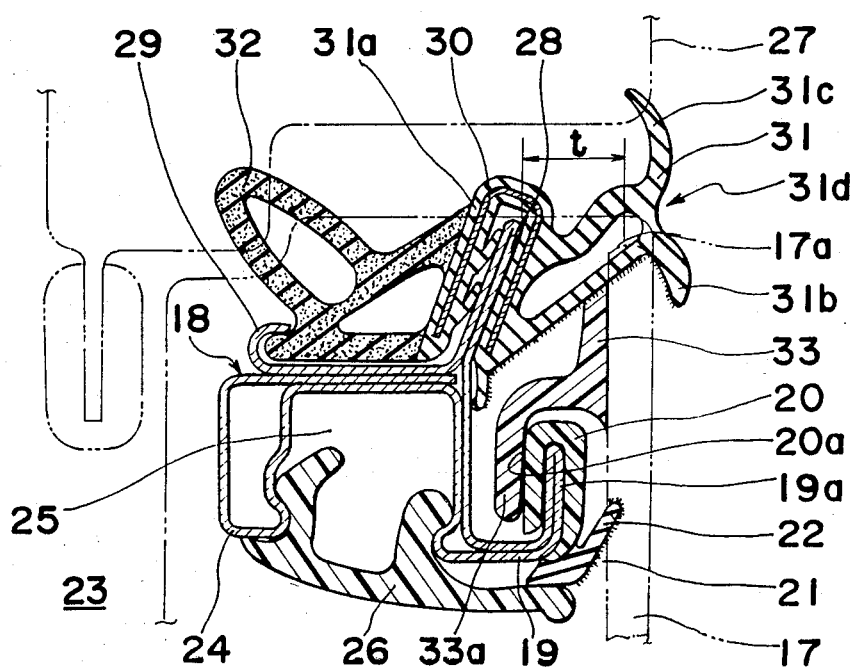
FIG. 5 is a view similar to FIG. 4, showing another preferred embodiment of the present invention.

In the foregoing embodiment shown in FIG. 4, the outer peripheral flange 28 has been described as lying in the plane parallel to the window pane 17, that is, extending generally in parallel relation to the window pane 17. This outer peripheral flange 28 may, however, be inclined towards the window pane 17, as shown in FIG. 5, so as to permit the windowpane sealing member 31 to be positioned closer to the window pane 17 than that in the foregoing embodiment with the tongue 31b consequently more tightly elastically engaged with the peripheral edge 17a of the window pane 17 than that in the foregoing embodiment. The angle of inclination of the outer peripheral flange 28 in the embodiment shown in FIG. 5 is so selected that the free side edge of the outer peripheral flange 28 can be spaced a distance, shown by t, required for each of the guide blocks 33 to be installed by insertion through a gap between the outer peripheral flange 28 and the door body 16.

Although the present invention has fully been described in connection with the preferred embodiments thereof with reference to the accompanying drawings, it is to be noted that various changes and modifications are apparent to those skilled in the art. By way of example, in any one of the illustrated and described embodiments, the guide rail 20 has been described as mounted on the back-turned flange portion 19a of the inner peripheral flange 19. However, the back-turned flange portion 19a itself may be used as a guide rail.

Accordingly, such changes and modifications are to be understood as included within the scope of the present invention as defined by the appended claims,

We claim:

1. A door assembly for an automobile having a door body, which comprises:

a window pane adapted to be raised from and lowered into the door body;

a window sash mounted on the top of the door body and positioned generally inwardly of the window pane with respect to the interior of the automobile, said window sash including an inner peripheral flange of generally U-shaped cross section opening in a direct towards and outwardly of a pheripheral edge of the window pane and an outer peripheral fange positioned exteriorly with respect to said inner peripheral flange, said outer peripheral flange carrying a sealing member for sealing a gap between a peripheral edge of the window pane and the window sash; and a plurality of guide blocks secured to the window pane, each of said plurality of guide blocks having a finger portion slidingly protruding into the U-sectioned space in the inner peripheral flange for guiding the window pane during the raising and lowering thereof from and into the door body.

2. A door assembly as claimed in claim 1, wherein said inner peripheral flange is formed as a guide rail cooperable with each of the plurality of guide blocks, each of said plurality of guide blocks being secured to the window pane adjacent the peripheral edge thereof with the respective finger portion slidingly engaging the guide rail.

3. A door assembly as claimed in claim 1, wherein said outer peripheral flange is inclined towards the window pane.

4. A door assembly as claimed in claim 1, wherein said inner peripheral flange is formed as a guide rail cooperable with each of the plurality of guide blocks, each of said plurality of guide blocks being secured to the window pane adjacent the peripheral edge thereof with the respective finger portion slidingly engaging the guide rail, said outer peripheral flange being inclined towards the window pane.

5. A door assembly as claimed in claim 2, wherein said guide rail is provided with an elastic lip member for sealing a gap between the window pane and the guide rail.

6. A door assembly as claimed in claim 2, wherein said guide rail is provided with a rail member for guiding the plurality of guide blocks secured to the window pane, said rail member being made of synthetic resin.

7. A door assembly as claimed in claim 3, wherein said sealing member has a mounting portion through which said sealing member is mounted on the outer peripheral flange, and a sealing portion composed of a first tongue for exteriorly covering the peripheral edge of the window pane and a second tongue for extending towards an automobile body structure.

8. A door assembly as claimed in claim 6, wherein a portion of the rail member confronting the window pane is provided with an elastic lip member for sealing a gap between the window pane and the guide rail.

9. A door assembly as claimed in claim 4, wherein said guide rail is provided with a rail member for guiding the plurality of guide blocks secured to the window pane, said rail member being made of synthetic resin, wherein said sealing member has a mounting portion through which said sealing member is mounted on the outer peripheral flange, and a sealing portion having a first tongue for exteriorly covering the peripheral edge of the window pane and a second tongue for extending towares an automobile body structure, wherein a portion of the rail member confronting the window pane is provided with an elastic lip member for sealing a gap between the window pane and the guide rail.

* * * * *